United States Patent
Huang et al.

(10) Patent No.: US 10,769,152 B2
(45) Date of Patent: Sep. 8, 2020

(54) AUTOMATED LOG ANALYSIS

(71) Applicant: CISCO TECHNOLOGY, INC., San Jose, CA (US)

(72) Inventors: Xinyuan Huang, San Jose, CA (US); Manoj Sharma, Sunnyvale, CA (US); Debojyoti Dutta, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 217 days.

(21) Appl. No.: 15/368,373

(22) Filed: Dec. 2, 2016

(65) Prior Publication Data
US 2018/0157713 A1    Jun. 7, 2018

(51) Int. Cl.
*G06F 16/22* (2019.01)
*G06F 16/2455* (2019.01)

(52) U.S. Cl.
CPC .............................. *G06F 16/24568* (2019.01)

(58) Field of Classification Search
CPC .................................................. G06F 17/30321
See application file for complete search history.

(56) References Cited

U.S. PATENT DOCUMENTS

| | | | | |
|---|---|---|---|---|
| 7,451,145 | B1 * | 11/2008 | Boxmeyer | ............ H04L 43/065 |
| 7,912,916 | B2 * | 3/2011 | Rakowski | ............ G06F 9/44505 |
| | | | | 709/203 |
| 9,166,988 | B1 | 10/2015 | Shin et al. | |
| 2007/0239799 | A1 * | 10/2007 | Modi | ..................... G06F 16/116 |
| 2015/0088959 | A1 * | 3/2015 | Doddavula | ............. H04L 67/02 |
| | | | | 709/201 |
| 2016/0004733 | A1 * | 1/2016 | Cao | ..................... G06F 11/0709 |
| | | | | 707/755 |
| 2016/0299934 | A1 * | 10/2016 | Karandikar | ....... G06F 17/30368 |

OTHER PUBLICATIONS

Tan, J., et al., "SALSA: Analyzing Logs as StAte Machines," WASL. Dec. 7, 2008, 8pages; https://www.usenix.org/legacy/event/wasl08/tech/full_papers/tan/tan_html/.
"Splunk® Enterprise Search Manual 6.5.0," Copyright © 2016 Splunk Inc., Oct. 18, 2016, 3 pages; http://docs.splunk.com/Documentation/Splunk/6.5.0/Search/Abouttransactions.
"Transaction Mining for Deeper Machine Data Intelligence," Blog post by bruno, Oct. 22, 2014, Sumo Logic, 6pages; https://www.sumologic.com/blog-machine-data-analytics/transaction-mining-for-deeper-machine-data-intelligence/.

* cited by examiner

*Primary Examiner* — Hung Q Pham
(74) *Attorney, Agent, or Firm* — Polsinelli PC

(57) ABSTRACT

There is disclosed in an example a computer-implemented method of providing automated log analysis, including: receiving a log stream comprising a plurality of transaction log entries, the log entries comprising a time stamp, a component identification (ID), and a name value pair identifying a transaction; creating an index comprising mapping a key ID to a name value pair of a log entry; and selecting from the index a key ID having a relatively large number of repetitions. There is also disclosed an apparatus and computer-readable medium for performing the method.

20 Claims, 6 Drawing Sheets

AUTOMATED LOG ANALYSIS

FIELD OF THE SPECIFICATION

This disclosure relates in general to the field of computing, and more particularly, though not exclusively to, a system and method for automated log analysis.

BACKGROUND

Data centers are a common fixture in computing ecosystems, and especially in cloud computing. Data centers may have many commoditized resources such as processors, data storages, and even network links. The commoditized resources can fail or become overloaded. In that case, it is beneficial to have an agile system wherein resources can quickly be redistributed, and new resources can be brought online. To that end, a software-defined networking (SDN) architecture may be provisioned to provide a cloud backbone.

Software-defined networking (SDN) is an approach to computer networking that allows network administrators to manage network services through abstraction of higher-level functionality. This is done by decoupling the system that makes decisions about where traffic is sent (the control plane) from the underlying systems that forward traffic to the selected destination (the data plane). SDN may require a method for the control plane to communicate with the data plane.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
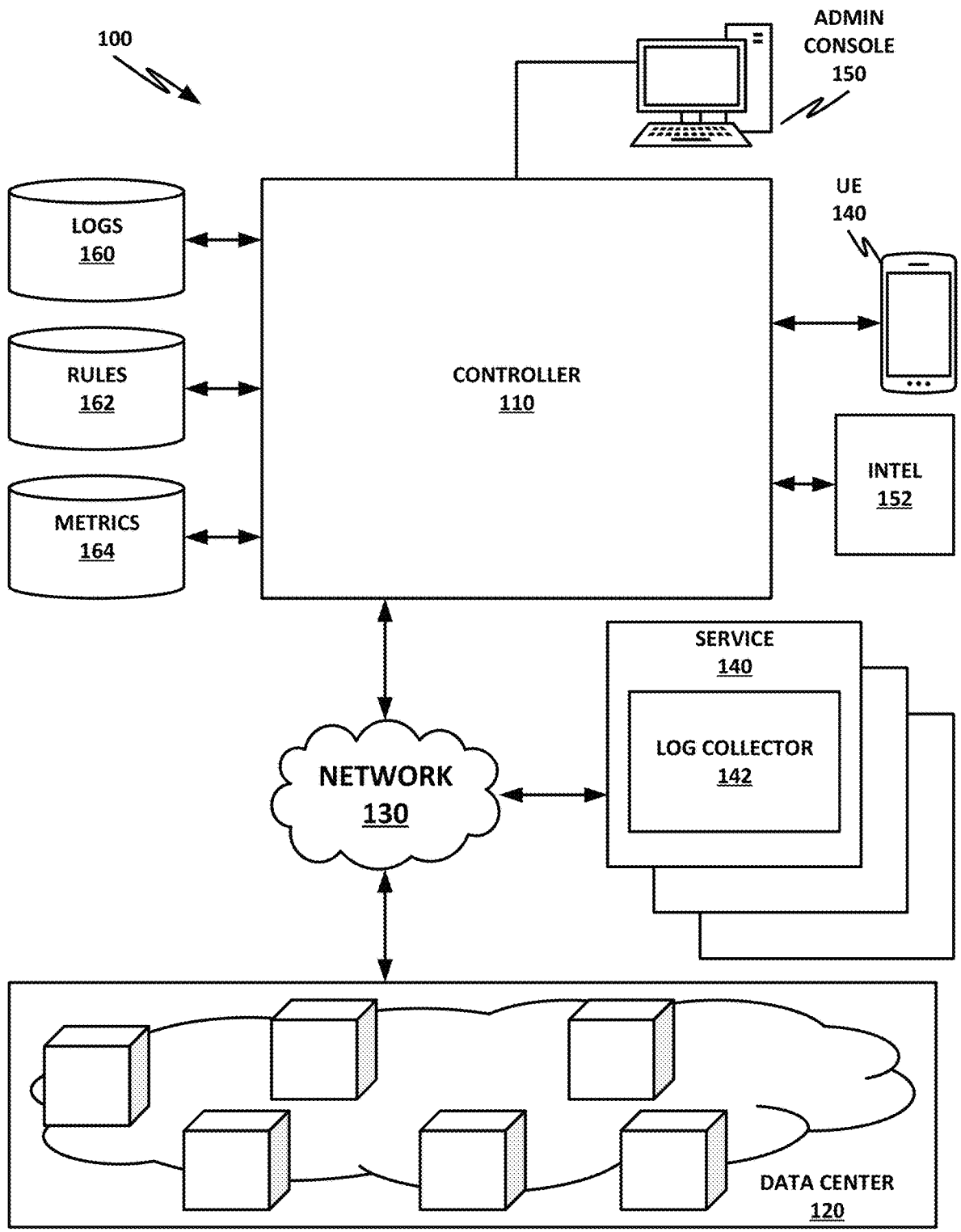
FIG. 1 is a block diagram of a cloud ecosystem according to one or more examples of the present specification.

There is disclosed in an example a computer-implemented method of providing automated log analysis, comprising: receiving a log stream comprising a plurality of transaction log entries, the log entries comprising a time stamp, a component identification (ID), and a name value pair identifying an event; creating an index comprising indexing the transaction log entries, comprising mapping a key ID to a component ID of a log entry; and selecting from the index a key ID having a relatively large number of repetitions. There is also disclosed an apparatus and computer-readable medium for performing the method.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Furthermore, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

As life moves increasingly online in the developed world, handling data becomes a universal challenge for every enterprise that provides any kind of data services. This may be particularly challenging for cloud services vendors. For example, consider an online e-mail service provider. Every time a user logs in, many events are generated and logged. The login event itself is logged, as well as the fact that the user clicked on a particular e-mail or folder, re-read a previous e-mail, marked an old e-mail as "unread," tagged an e-mail for follow-up, tagged another as important, and flagged another as spam. Now consider the case where this cloud service provider also provides backups and web applications like spreadsheets. A single user may generate scored of logged events in a single day. Now multiply that by millions of users for large cloud services vendors, and the number of events in the log may be truly staggering.

As used throughout this specification, a "transaction" includes one or more events that are logically grouped together. Cloud applications may generate staggering volumes of log messages, including repeated sequences of stateful events or transactions. Cloud services operators are not practically capable of inspecting every transaction manually. Rather, operators are challenged to identify meaningful trends and use those logs to identify larger, system-level trends and make relevant decisions about how to manage, allocate, and monetize available resources. Exacerbating the difficulty is the fact that operators may need detect and track trends without even knowing in advance how to describe them.

Indeed, a priori knowledge of what trends to look for can greatly reduce the complexity of the management task. Many problems can be solved with the clever application of scripting and regular expressions. But log diving presents a classic case where the operator may not even know what it doesn't know. Such problems can be difficult to solve with existing log management tools that may require users to define the transaction form, or that may require an advance transaction template to track conforming events. In highly complex systems, the users may not even know exactly what they are looking for, much less how to build a template around it.

For example, at least some embodiments of certain existing log management systems (e.g., Splunk and SumoLogic) employ search-based techniques for analyzing transactions. A user may manually define search queries (either through APIs or using configuration files) to extract and track identifiers of stateful events (e.g. transaction IDs, or certain events marking the start/end of a transaction) from log messages. But defining the queries requires a priori knowledge of where and how transactions can be identified, or how transaction identifiers may be extracted from each log events. Using this knowledge, the user can define search strings and parameters to identify transactions of interest.

Certain existing systems may also extract control-flow and data-flow states from Hadoop logs by matching event IDs. This may require a priori knowledge of Hadoop logs to extract transactions of interest. I In addition to these abilities, it is advantageous to provide a facility whereby users can discover meaningful transaction sequences that aid them in making important decisions (such as how to deploy and manage resources). This enhances transaction tracking in real-world use cases, especially where the user has limited knowledge of how to identify transactions from logs. This is beneficial, for example, because it is common for the application developer to have greater knowledge of how transactions are logged than the system administrator who manages resources.

It is also advantageous to provide a facility to detect transactions in generic log messages in a complex streaming environment, where different kinds of transactions exists and logs stream from multiple sources.

Embodiments of the present disclosure efficiently detect stateful event sequences, such as transactions and sessions, from large streams of log messages, without requiring the user to feed prior knowledge about how to identify and describe them. Rather, embodiments of the log analyzer of the present specification automatically detect transactions by discovering potential transaction identifiers from log messages.

In an example, the log analyzer receives as an input a log stream, and provides as an output a transaction model, which may include a description of transactional event sequences discovered by the analyzer. This description can be used to help define transaction tracking rules to properly and meaningfully track transactions in logs. The discrete unit of a log stream, as used in this specification, is a "log message," which may be any log unit that discretely identifies a logged event, transaction, or other item. A log message may include one or more fields, identified by a field name and a field value, such as in a ".json" file, by way of non-limiting example.

Log messages coming into the log analyzer may be assumed, in one example, to be in the following key-value format:

{time_field: timestamp, component_id_field: component_id, field_1: value_1, field_2: value_2, ...}

Note that ther terms "component" and "component ID," as used here should be understood broadly to encompass a component or an event (which may happen to or be associated with a component. Thus, the "component ID" may identify the component itself, or the event that happened to the component.

Logs may then be processed as follows:
Pre-processing
Field Filtering
Indexing
Key Selection
Transaction Modeling
Output
Pre-Processing In an embodiment, a system under analysis, such as a cloud service, sends a stream of logged events to the log analyzer. First, a pre-processor parses and structures incoming log messages, so that each log message is in the format of:

| Field Name | Field Value |
|---|---|

Each transaction may include a sequence of log messages generated from different components or events. Thus, the pre-processor may also ensure that each log message contains an identifier of the source component (or source event) from which the message is generated. Note that existing logging mechanisms may already provide this structure, so that the role of the pre-processor may be limited to ensuring that any log events not containing this information are diverted or rejected.

The pre-processor may also ensure that each transaction is identified by a locally unique identifier or transaction ID. Again note that many existing log facilities provide such explicit unique identifiers, and thus the role of the pre-processor may be limited to ensuring that any log events not containing an explicit ID are diverted or rejected.

Finally, the pre-processor may also filter out fields that are unlikely to be meaningful transaction identifiers, such as URLs, floating point values, common English words, or small integer values, e.g., integers less than a threshold, which may be configurable based on the context. Common values for such a threshold include powers of 10, such as 10, 100, 1,000, 10,000, 100,000, or 1,000,000. The foregoing are non-limiting examples only, and other unlikely fields may be selected for pre-processing.

Field Filtering

After pre-processing is complete, a field filter may be applied. The field filter chooses the {component, field} pairs likely to contain transaction identifiers as values. In an example, the filtering includes the following rules:

Field-Filtering-Rule-1:
The same field value does not reappear with the same {component, field} pair after a given time threshold.

Field-Filtering-Rule-2:
The field values appearing with the {component, field} pair are shared among multiple components within a given time threshold.

These rules are based on the principle that (1) unique transactions generally happen during a specific time period rather than being spread throughout the whole timeline; and (2) a transaction generally includes log messages from multiple events or components. Pairs that do not meet these criteria may be considered false positives.

Indexing

In one example, the indexer helps link multiple {component, field} pairs in real-time. This is analogous to performing a real-time "join" (similar to a database engines "join" of similar fields) of fields that are selected after the field filtering stage. The indexer creates the following mapping from incoming log streams:

key: a list of {component, field} pairs that can represent a sequence of events.

value: the list of field values that appear with the same list of {component, field} pairs.

Key Selection

In one example, the key selector keeps track of common mapping-key sequences, which allows the log analyzer to select frequently occurring mapping-key sequences. The key selector maintains a priority queue for the keys in the mapping, where each key represents a {component, field} sequence. The {component, field} sequences with the highest count of unique field values are placed at the top of the queue, and are selected as transaction sequences.

Transaction Modeling

Based on the foregoing key selection, a transaction modeler builds a transaction model for the system under analysis. Advantageously, building this transaction model does not require the operator to have any a priori knowledge of the log structures or values, nor are log messages required to be in a uniform or standardized format. Rather, the transaction model is built on the foregoing principles. The transaction model may highlight to the operator fields that appear to be important and that may have relevance to system operations. In certain embodiments, an interactive user interface, such as a graphical user interface (GUI) may be included to allow the user to select metrics for tracking and/or trending.

Advantageously, the log analyzer of the present specification does not require a user to provide a description of fields that identify transactions or their flows in logs. Indeed, the user may not know in advance which fields are most useful in identifying transactions and flows.

To successfully identify transactions without any prior information on flows or input from the user, Absent the log analyzer intelligence of the present disclosure, a log analysis system would require a list of component names and fields that correspond to the transaction identifiers. From that point onwards, to identify the transactions, the system would perform a join across different log lines on those fields, matching values of the fields that are the same, similar to how a database system would join different columns of different tables.

A system and method for automated log analysis will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of an example cloud ecosystem 100 according to one or more examples of the present specification. Cloud ecosystem 100 is an embodiment of one non-limiting example of a system and method for providing automated log analysis.

Figure 4:
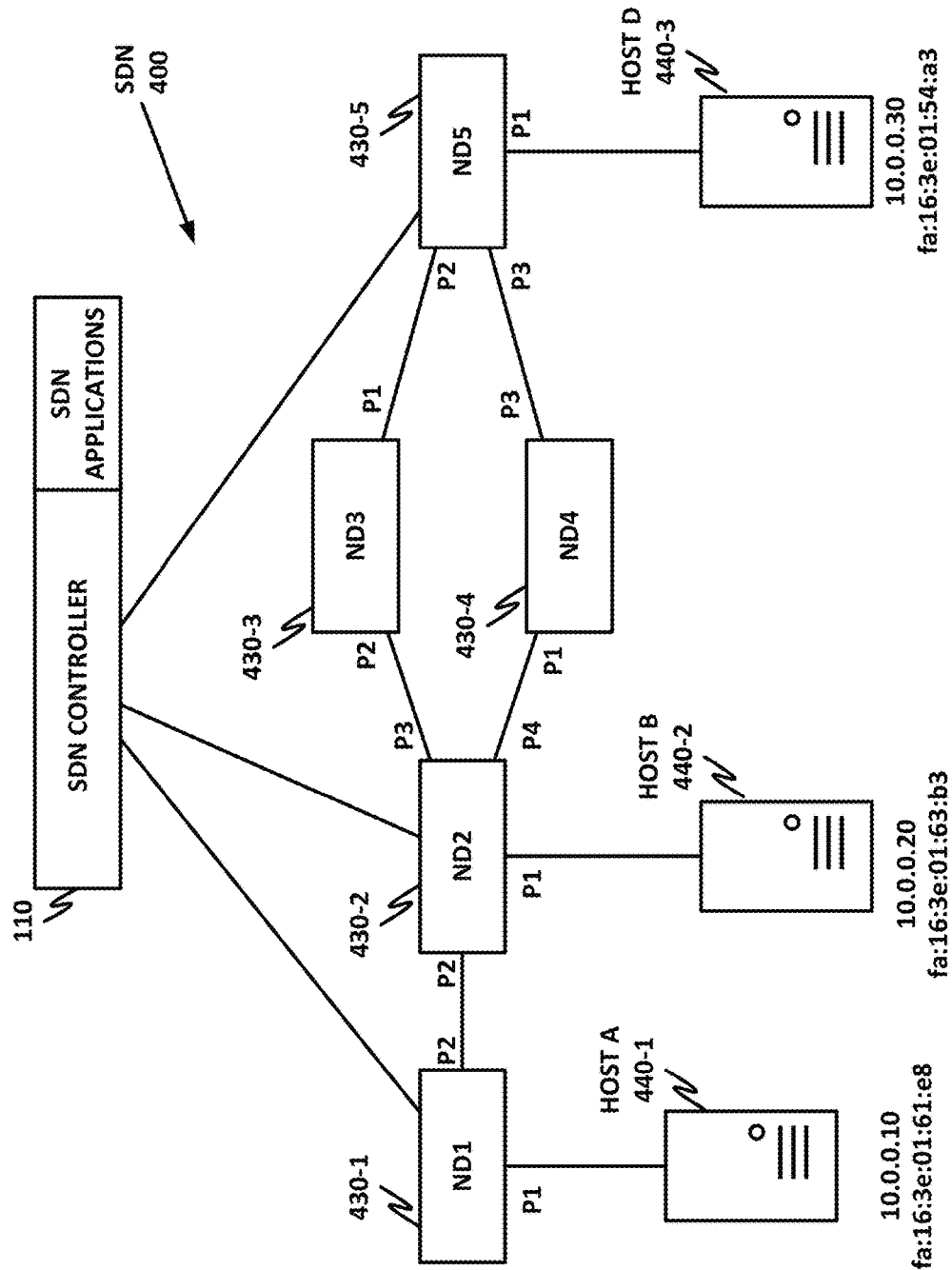
FIG. 4 is a block diagram of a software-defined network (SDN) according to one or more examples of the present specification.

In this embodiment, cloud ecosystem 100 includes a controller 110, including logic for performing automated log analysis in data center 120. In certain embodiments, such as those in which data center 120 is an SDN as illustrated in FIG. 4, controller 110 may be an SND controller (SDN-C). However, not all controllers 110 need necessarily be SDN-Cs, and not all SDN-Cs are configured to function as a controller 110. Thus, the illustrated embodiment should be understood as a non-limiting example, disclosed for the purpose of facilitating discussion and aiding in understanding the present disclosure.

Controller 110 may communicate with various resources of data center 120 (illustrated as cubes) via a network 130. Each resource or manager(s) of said resources can be associated with one or more services 140 implementing a log collector 142 for providing real-time logs and/or metrics associated with the resources to controller 110. Controller 110 can also communicate with the one or more services 140, via the network 130, or via another network not shown in FIG. 1. Log collector 142 can provide real-time logs and/or metrics associated with resources in data center 120, and associated with data center 120 in part or as a whole, to controller 110. To generate logs and/or metrics related to data center 120, services 140 could be communicatively connected to data center 120 directly, via network 130, or via another network not shown in FIG. 1.

Elements of FIG. 1 may be coupled to one another through one or more interfaces employing any suitable connections (wired or wireless), which provide viable pathways for network communications. Additionally, one or more of these elements of FIG. 1 may be combined, divided, or removed from the architecture based on particular configuration needs. Cloud ecosystem 100 may include a configuration capable of transmission control protocol/internet protocol (TCP/IP) communications for the transmission and/or reception of packets in the network. Cloud ecosystem 100 may also operate in conjunction with a user datagram protocol/IP (UDP/IP), any other suitable protocol, or any suitable combination thereof where appropriate and based on particular needs. For purposes of illustrating the techniques of the controller 110, it is important to understand the activities that may be present in cloud ecosystem 100. The following foundational information may be viewed as a basis from which the present disclosure may be properly explained. Such information is offered for purposes of explanation only and, accordingly, should not be construed in any way to limit the broad scope of the present disclosure and its potential applications.

Turning, again, to the infrastructure of FIG. 1, network 130 represents a series of points or nodes of interconnected communication paths for receiving and transmitting packets of information that propagate through the cloud ecosystem 100. Network 130 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Network 130 may also include one or more servers, firewalls, routers, switches, security appliances, antivirus servers, or other useful network devices, which in an example may be virtualized within an SDN. In this illustration, network 130 is shown as a single network for simplicity, but in some embodiments, network 130 may include a large number of networks, such as one or more enterprise intranets connected to the internet.

For ease of illustration, however, not all elements of FIG. 1 are depicted with communication lines traversing network 130. In network 130, network traffic, which could include packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node (e.g., controller 110) and a destination node via network 130. A packet includes, but is not limited to, a source network address, a destination network address, and a payload containing the information to be communicated. By way of example, these network addresses can be Internet Protocol (IP) addresses in a TCP/IP messaging protocol. Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks.

Services 140 can be configured to provide system logs and metrics of the resources in data center 120 to controller 110. System metrics can include information related to or summarizing current system state and/or activity including, but not limited to, number of on-going client operations, current central processing unit (CPU) utilization, disk usage or load on the storage nodes, available network bandwidth, remaining disk input/output operations per second (IOPS), remaining disk bandwidth, etc. In at least one embodiment, these metrics can be pushed to the controller 110 by the metrics collectors in real-time. The controller 110 or services 140 may store the metrics in metrics repository 164, which may be internal to the controller 110 or external (entirely or in part). In other embodiments, services 140 may store real-time system metrics in the metrics repository 164 without accessing the controller 110.

In some cases, services 140 can be configured to log events and activities in data center 120 to controller 110. Logs can include information related to events, errors, device drivers, system changes, etc. In at least one embodiment, these logs can be pushed to the controller 110 by the services 140 in real-time. The controller 110 or services 140 may store the system logs in logs repository 160, which may be internal to the controller 110 or external (entirely or in part). In other embodiments, services 140 may store real-time system logs in the logs repository 160 without accessing the controller 110. In certain embodiments, log messages may be parsed and structured via software such as Logstash or Fluentd, where each log message comes with the format of a set of {field: value} pairs. Each transaction may include of a sequence of log messages generated from different components or events. Each log message may contain an identifier of the source component (or source event) from whence the message is generated. Each transaction may be identified with a unique identifier (e.g. transaction ID) that is explicitly present in the log messages.

Controller 110 can be implemented by one or more network elements in cloud ecosystem 100. As used herein, the term 'network element' is meant to encompass servers, processors, modules, routers, switches, cable boxes, gateways, bridges, load balancers, firewalls, inline service nodes, proxies, or any other suitable device, component, element, or proprietary appliance operable to exchange information in a network environment. This network element may include any suitable hardware, software, components, modules, or interfaces that facilitate the operations thereof. This may be inclusive of appropriate algorithms and communication protocols that allow for the effective exchange of data or information.

Figure 2:
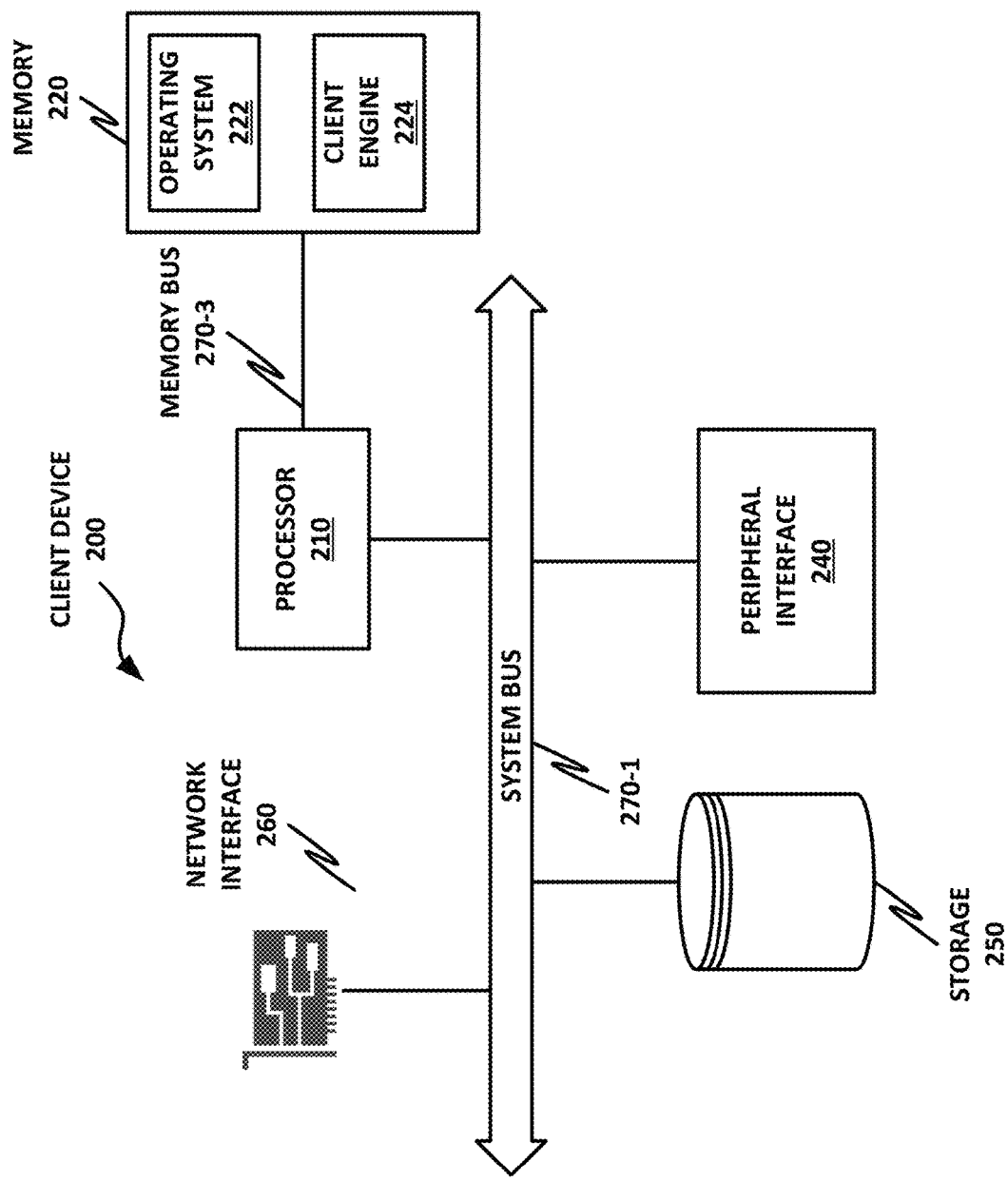
FIG. 2 is a block diagram of a client-class computing device, such as a user equipment (UE) or endpoint device, according to one or more examples of the present specification.

FIG. 2 is a block diagram of a client device according to one or more examples of the present specification. The client device may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host." In certain embodiments, UE 140 and administration console 150 may be examples of client devices.

Client device 200 includes a processor 210 connected to a memory 220, having stored therein executable instructions for providing an operating system 222 and at least software portions of a security engine 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of security engine 224. Many other configurations are also possible, and are intended to be encompassed within the broad scope of this specification.

Network interface 260 may be provided to communicatively couple Client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Security engine 224, in one example, is operable to carry out computer-implemented methods as described in this specification. Security engine 224 may include one or more tangible non-transitory computer-readable mediums having stored thereon executable instructions operable to instruct a processor to provide a security engine 224. As used throughout this specification, an "engine" includes any combination of one or more logic elements, of similar or dissimilar species, operable for and configured to perform one or more methods provided by the engine. Thus, security engine 224 may comprise one or more logic elements configured to provide methods as disclosed in this specification. In some cases, security engine 224 may include a special integrated circuit designed to carry out a method or a part thereof, and may also include software instructions operable to instruct a processor to perform the method. In some cases, security engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that security engine 224 may also include other hardware and software, including configuration files, registry entries, and interactive or user-mode software by way of non-limiting example.

In one example, security engine 224 includes executable instructions stored on a non-transitory medium operable to perform a method according to this specification. At an appropriate time, such as upon booting Client device 200 or upon a command from operating system 222 or a user 120, processor 210 may retrieve a copy of the instructions from storage 250 and load it into memory 220. Processor 210 may then iteratively execute the instructions of security engine 224 to provide the desired method.

Peripheral interface 240 may be configured to interface with any auxiliary device that connects to Client device 200 but that is not necessarily a part of the core architecture of Client device 200. A peripheral may be operable to provide extended functionality to Client device 200, and may or may not be wholly dependent on Client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
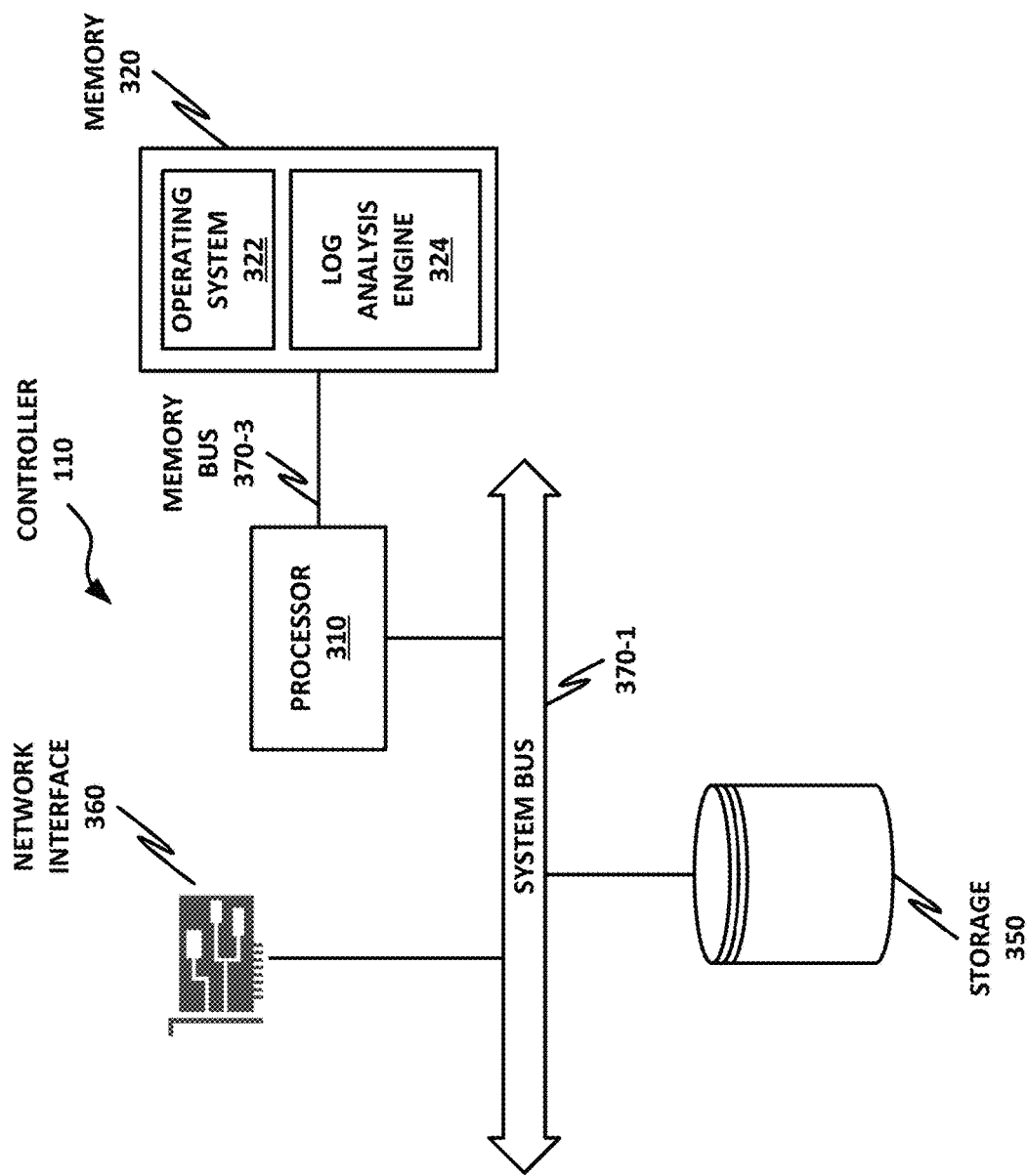
FIG. 3 is a block diagram of a server-class computing device according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein UE 140 provides certain localized tasks, while server 300 provides certain other centralized tasks. In contemporary practice, server 300 is more likely than UE 140 to be provided as a "headless" VM running on a computing cluster, or as a standalone appliance, though these configurations are not required.

In certain embodiments, controller 110, log collector 142, and data center resources may be embodied as server-class devices 300.

Server 300 includes a processor 310 connected to a memory 320, having stored therein executable instructions for providing an operating system 322 and at least software portions of a log analysis engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of log analysis engine 324.

Network interface 360 may be provided to communicatively couple server 140 to a wired or wireless network, and may include one or more logic elements as described in FIG. 2.

Log analysis engine 324 is an engine as described in FIG. 2 and, in one example, includes one or more logic elements operable to carry out computer-implemented methods as described in this specification. Software portions of log analysis engine 324 may run as a daemon process.

Log analysis engine 324 may include one or more non-transitory computer-readable mediums having stored thereon executable instructions operable to instruct a processor to provide a security engine. At an appropriate time, such as upon booting server 140 or upon a command from operating system 322 or a user or security administrator, processor 310 may retrieve a copy of log analysis engine 324 (or software portions thereof) from storage 350 and load it into memory 320. Processor 310 may then iteratively execute the instructions of log analysis engine 324 to provide the desired method.

FIG. 4 is a block diagram of a software-defined network 400. In some examples, the illustration of FIG. 4 may focus more on the functional aspects of SDN 400, while the illustration of FIG. 1 is more of a logical view of the network. It should be understood, however, that SDN 400 and network 100 of FIG. 1 may be the same network, or may be separate networks.

SDN 400 may include an SDN controller 410, a plurality of network devices 430, and a plurality of host devices 440. Some or all of SDN controller 410, network devices 430, and host devices 440 may be embodied as virtual machines running in a "cloud" environment, such as an OpenStack-compatible infrastructure.

SDN 400 is controlled by an SDN controller 410. SDN controller 410 is communicatively coupled to a plurality of network devices 430. Specifically, ND1 430-1, ND2 430-2, and ND5 430-5 are directly communicatively coupled to SDN controller 410. Network devices and ND3 430-3 and ND4 430-4 are not directly coupled to SDN controller 410, but rather coupled via the intermediate devices, such as ND2 430-2, and ND5 430-5.

Some network devices 430 also communicatively couple directly to host devices 440. Specifically, network device ND1 directly couples to host A 440-1, which has IP address 10.0.0.10, and MAC address FA:16:3:01:61:8. Network device ND2 430-2 directly couples to host B 440-2, which has IP address 10.0.0.20, and MAC address FA:16:3:01:63:B3. Network device ND5 430-5 directly couples to host D 440-3, which has IP address 10.0.0.30, and MAC address FA:16:3:01:54:83.

Network devices 430 may be configured to perform a variety of network functions, such as by way of nonlimiting example, load-balancing, firewall, deep packet inspection (DPI), DNS, antivirus, or any other suitable network function. The particular arrangement of interconnections between network devices 430 and from network devices 430 to host devices 440 may be determined by the particular network configuration and needs. Thus, the specific configuration of FIG. 4 should be understood to be an illustrative example only.

Each network device 430 may have a plurality of ingress and or egress interfaces, such as physical Ethernet ports. In an example, each interface may have a label or new name, such as P1, P2, P3, P4, P5, and so on. Thus, certain aspects of the network layout can be determined by inspecting which devices are connected on which interface. For example, network device ND1 430-1 has an ingress interface for receiving instructions and communicating with SDN controller 410. ND1 430-1 also has an interface P1 communicatively coupled to host A 440-1. ND1 430-1 has interface P2 that is communicatively coupled to ND2 430-2. In the case of ND2 430-2, it also couples to ND1 430-1 on its own interface P2, and couples to host B 440-2 via interface P1. ND2 430-2 communicatively couples to intermediate devices ND3 430-3 and ND4 430-4 via interfaces P3 and P4 respectively. Additional interface definitions are visible throughout the figure.

Figure 5:
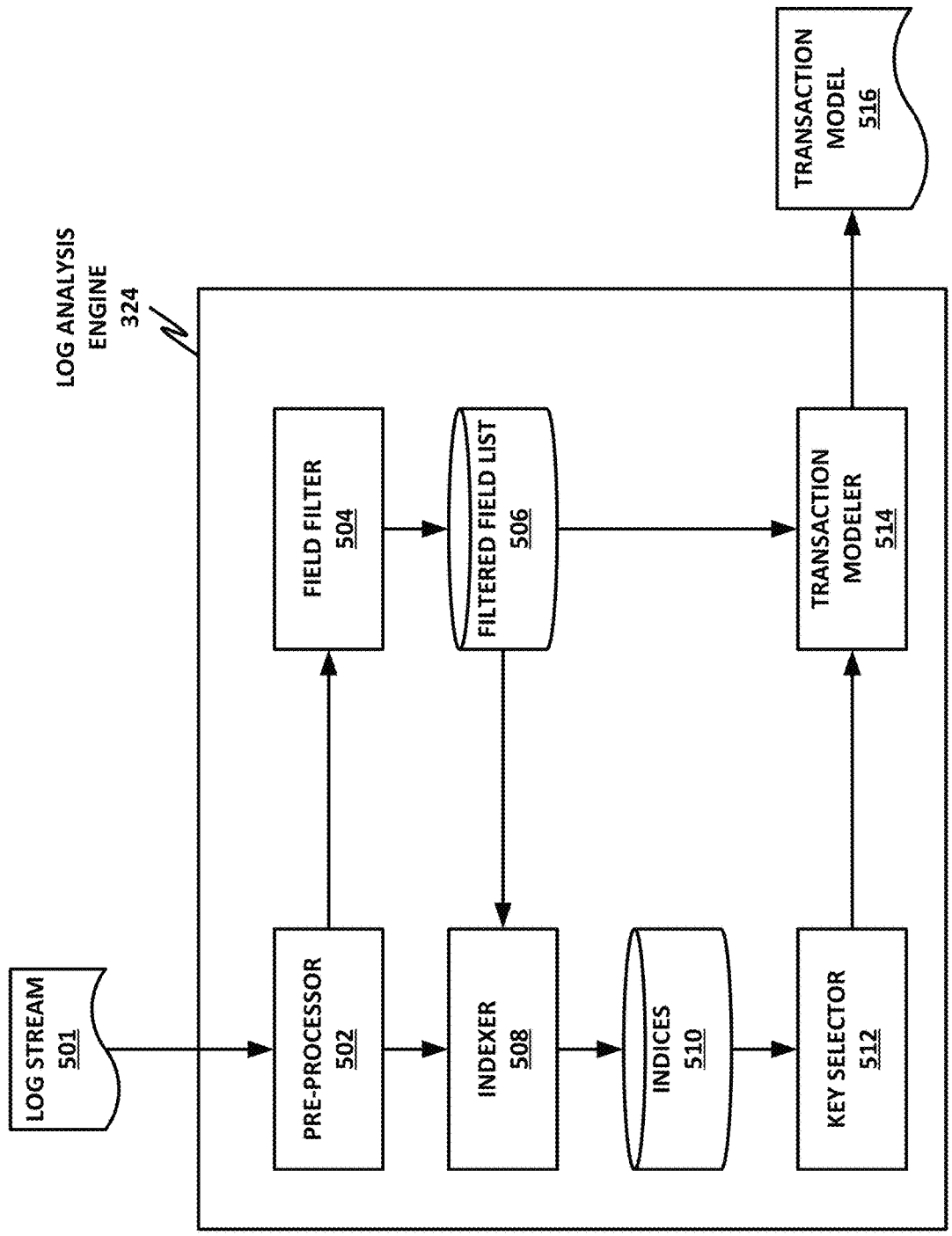
FIG. 5 is a block diagram of a log analysis engine according to one or more examples of the present specification.

FIG. 5 is a block diagram of a log analysis engine according to one or more examples of the present specification. In one example, the logical blocks disclosed in FIG. 5 are each discrete software components that are loaded into memory at runtime and executed on a processor to provide the functionality of a log analysis engine. In another example, each logical block is (or includes) discrete subroutines stored on a tangible, non-transitory computer-readable medium. However, these examples are non-limiting. In other examples, separate circuits or ASICs could provide some functions, or different functions could be performed by separate computing devices in a distributed fashion. Note also that there may be overlap in the blocks disclosed. For example, a discrete software and/or hardware module may provide the functions of both pre-processor 502 and indexer 508. In another example, a particular function (e.g., key selector 512) could be split across a plurality of software and/or hardware modules. In yet another example, a hybrid system could be provided in which some logical functions are combined and others are split.

In an embodiment, a system under analysis, such as a cloud service 100 of FIG. 1 or SDN 400 of FIG. 4, sends a stream of logged events (log stream 501) to log analysis engine 324.

As necessary, pre-processor 502 parses and structures incoming log messages, so that each log message is in the format of:

| Field Name | Field Value |
| --- | --- |

Each transaction may include a sequence of log messages generated from different components or events. Thus, pre-processor 502 may also ensure that each log message contains an identifier of the source component (or source event) from which the message is generated. Note that existing logging mechanisms may already provide this structure, so that the role of pre-processor 502 may be limited, in some embodiments, to ensuring that any log events not containing this information are diverted or rejected.

Pre-processor 502 may also ensure that each transaction is identified by a locally unique identifier or transaction ID. Again note that many existing log facilities provide such explicit unique identifiers, and thus the role of pre-processor 502 may be limited, in some embodiments, to ensuring that any log events not containing an explicit ID are diverted or rejected.

Finally, pre-processor 502 may also filter out fields that are unlikely to be meaningful transaction identifiers, such as URLs, floating point values, common English words, or small integer values, e.g., integers less than a threshold, which may be configurable based on the context. Common values for such a threshold include powers of 10, such as 10, 100, 1,000, 10,000, 100,000, or 1,000,000. The foregoing are non-limiting examples only, and other unlikely fields may be selected for pre-processing.

After pre-processing is complete, field filter 504 may apply appropriate filters. Field filter 504 chooses the {component, field} pairs likely to contain transaction identifiers as values. In an example, the filtering includes the following rules:

Field-Filtering-Rule-1:
The same field value does not reappear with the same {component, field} pair after a given time threshold.

Field-Filtering-Rule-2:
The field values appearing with the {component, field} pair are shared among multiple components within a given time threshold.

These rules are based on the principle that (1) unique transactions generally happen during a specific time period rather than being spread throughout the whole timeline; and (2) a transaction generally includes log messages from multiple events or components. After applying these rules, field filter 504 creates a filtered field list 506.

In one example, indexer 508 helps link multiple {component, field} pairs in real-time. This is analogous to performing a real-time "join" (similar to a database engines "join" of similar fields) of fields that are selected after the field filtering stage. Indexer 508 creates the following mapping from filtered field list 506:

key: a list of {component, field} pairs that can represent a sequence of events.

value: the list of field values that appear with the same list of {component, field} pairs.

Indexer 508 stores the indexed fields in indices store 510.

In one example, key selector 512 keeps track of common mapping-key sequences, which allows the log analyzer to select frequently occurring mapping-key sequences. Key selector 512 examines indices store 510 and maintains a priority queue for the keys in the mapping, where each key represents a {component, field} list. The {component, field} lists with the highest count of unique field values are placed at the top of the queue, and are selected as transaction sequences.

Based on the foregoing key selection, transaction modeler 514 builds a transaction model 516 for the system under analysis. Advantageously, building this transaction model does not require the user to have any a priori knowledge of the log structures or values, nor are log messages required to be in a uniform or standardized format. Rather, the transaction model is built on the foregoing principles. The transaction model may highlight to the user fields that appear to be important and that may have relevance to system operations. In certain embodiments, an interactive user interface, such as a graphical user interface (GUI) may be included to allow the user to select metrics for tracking and/or trending.

Figure 6:
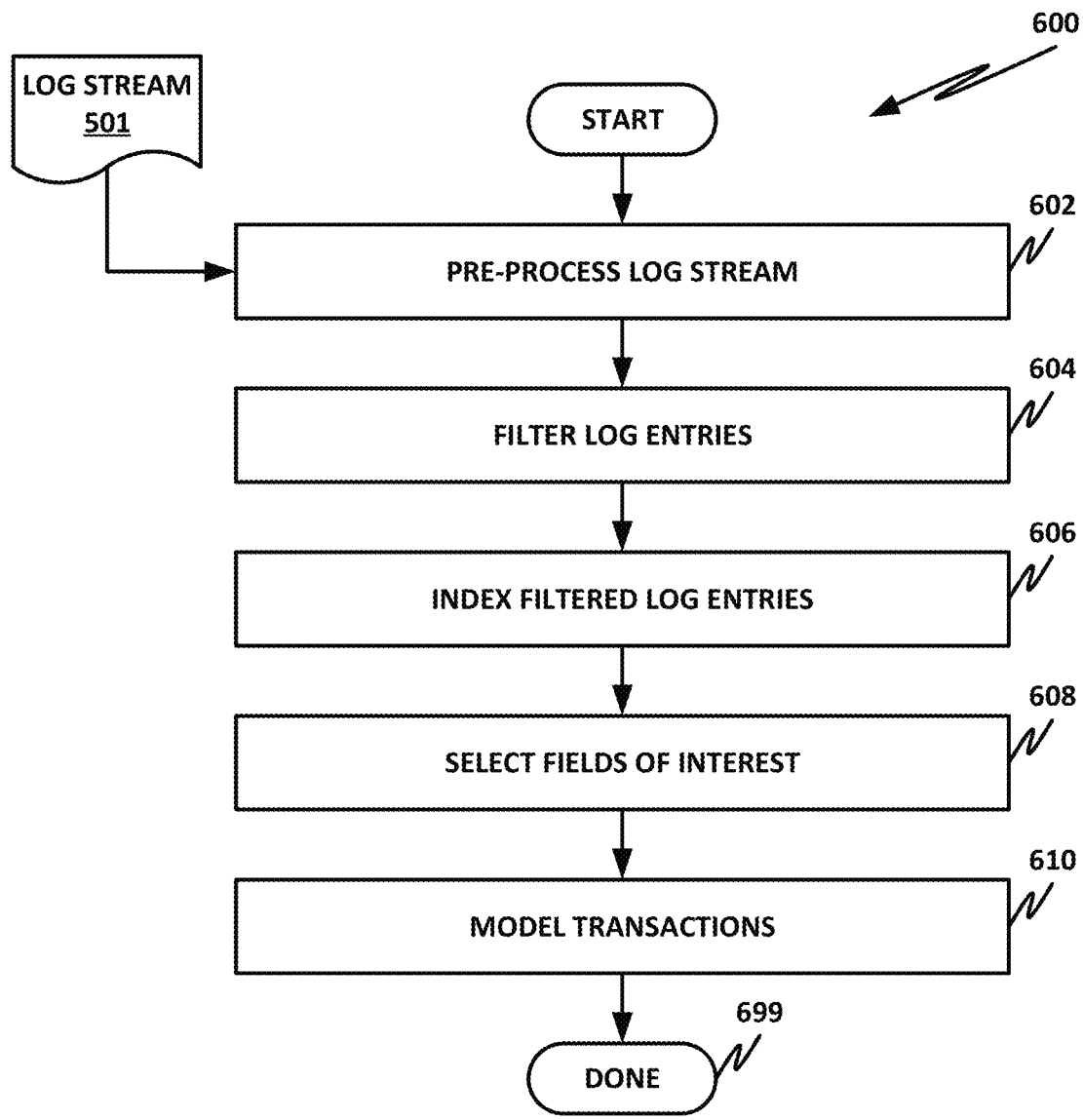
FIG. 6 is a flow chart of a log analysis method according to one or more examples of the present specification.

FIG. 6 is a flow chart of a method 600 of performing log analysis on an input log stream 501 according to one or more examples of the present specification. Method 600 may be performed, in one example, by log analysis engine 324, though in general, method 600 may be any computer-implemented method for performing log analysis. Thus, in reference to this figure, the operations of this method are said to be carried out by a "log analyzer." A log analyzer should be understood to include any suitable hardware, software, firmware, or combination unit configured for and operable to carry out the operations of method 600.

In block 602, the log analyzer performs pre-processing on input log stream 501. An example of pre-processing is discussed above, in connection with pre-processor 502 of FIG. 5.

In block 604, the log analyzer filters log entries according to filtering rules, such as filtering-rule-1 and filtering-rule-2. An example of filtering is discussed above, in connection with field filter 504 of FIG. 5. The result of this filtering is a filtered field list.

In block 606, the log analyzer indexes the filtered field list to create key-value mappings. An example of indexing is discussed above, in connection with indexer 508 of FIG. 5. This results in an indices store.

In block 608, the log analyzer selects fields of interest, thus identifying the most relevant fields for a user or system administrator. An example of key selection is discussed above, in connection with key selector 512.

In block 610, the log analyzer models the transactions in the selected fields to create a transaction model that is useful to the user or system administrator. An example of transaction modeling is discussed above, in connection with transaction modeler 514 of FIG. 5.

In block 699, the method is done.

Example

As an example, take the following log entries, which are deemed to be partially pre-processed in that pre-processor 502 has already determined that they conform to the expected log message format. Each line in this log entry is a log message, representing a scenario where a cloud service has multiple events across multiple components. In this example, the log analyzer analyzes logs from the cloud service (system under analysis) and automatically determines that an instance of a resource was created.

```
{timestamp: 0, component_id field: API_Controller, instance_id:
    e3f530bc682, field_1_2: value_2}
{timestamp: 1, component_id_field: Compute_Controller, field_2_1:
    value_3, instanceid: e3f530bc682, ipaddress: 10.0.0.1}
{timestamp: 2, component_id_field: Compute_Host, instance:
    e3f530bc682, controller_ip_address: 10.0.0.1}
...
{timestamp: 200, component_id_field: API_Controller, instance_id:
    7d362e64384, field_1_2: value_2}
{timestamp: 201, component_id_field: Compute_Controller, field_2_1:
    value_3, instanceid: 7d362e64384, ipaddress: 10.0.0.1}
{timestamp: 202, component_id_field: Compute_Host, instance:
    7d362e64384, controller_ip_address: 10.0.0.1}
```

Here, instance ID e3f530bc682 is being processed in the cloud network. The components "API_Controller", "Compute_Controller" and "Compute_Host" are processing the request. But they use different field names in the log to identify the instance ID ("instance_id," "instanceid," and "instance," respectively). Also note that some, but not all, components identify the controller's IP address, which appears in every transaction but does not meaningfully help to link the flow of transactions.

Field filter 504 applies appropriate field filters and identifies the following list of {component, field} pairs:

```
{API_Controller, instance_id}
{Compute_Controller, instanceid}
{Compute_Host, instance}
...
```

Note that field filter 504 applied field-filtering-rule-2 to filter out the pairs {API_Controller, field_1_2} and {Compute_Controller, field_2_1}, and field-filtering-rule-1 to filter out pairs such as {Compute_Controller, ipaddress}, {Compute_Host, controller_ip_address}, and others.

Indexer 508 automatically links these events by noticing that they refer to the same unique string. The resultant mappings are:

| Key | Value |
|---|---|
| [{Api_Controller, instance_id}, {Computer_Controller, instanceid}, {Compute_Host, instance}] | [e3f530bc682, 7d362e64384] |
| ... | ... |

Key selector 512 chooses the top keys (i.e. sequences of events) from the above mapping based on the size of their values (i.e. the number of times the same sequence is repeated). The output may include, for example:

Transaction-model-1 (each item in the list represents a sequence of events for a certain type of transaction):

```
[{Api_Controller, instance_id}, {Computer_Controller, instanceid},
    {Compute_Host, instance}]
...
```

Transaction-model-2 (each item in the list tells where and how a transaction identifier can be extracted)

```
{Api_Controller, instance_id}
{Computer_Controller, instanceid}
{Compute_Host, instance}
...
```

Based on this information, transaction modeler 514 may define transaction tracking rules to track transactions based on their identities. The log analyzer may notify the user, such as via a user interface, and allow the user to select which transactions to track and how to track them.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a computer-implemented method of providing automated log analysis, comprising: receiving a log stream comprising a plurality of transaction log entries, the log entries comprising a time stamp, a component identification (ID), and a name value pair identifying a transaction; creating an index comprising mapping a key ID to a name value pair of a log entry; and selecting from the index a key ID having a relatively large number of repetitions.

There is further disclosed an example, further comprising filtering the plurality of transaction log entries to eliminate false positives.

There is further disclosed an example, wherein filtering the plurality of transaction log entries comprises filtering if the same field value reappears with the same {component, field} pair after a time threshold.

There is further disclosed an example, wherein filtering the plurality of transaction log entries comprises filtering if a value appearing with a {component, field} pair is shared among multiple components within a time threshold.

There is further disclosed an example, further comprising pre-processing the plurality of transaction log entries to eliminate a field unlikely to be a meaningful transaction identifier.

There is further disclosed an example, wherein the field unlikely to be a meaningful transaction identifier is selected from the group consisting of a uniform resource locator (URL), media access control (MAC) address, a floating point value, a common English word, and an integer value below a threshold.

There is further disclosed an example, wherein the threshold is contextual.

There is further disclosed an example of a computing apparatus, comprising: a log analysis engine comprising at least a processor and a memory, the log analysis engine to: receive a log stream comprising a plurality of transaction log entries, the log entries comprising a time stamp, a component identification (ID), and a name value pair identifying a transaction; create an index comprising mapping a key ID to a name value pair of a log entry; and select from the index a key ID having a relatively large number of repetitions.

There is further disclosed an example, wherein the log analysis engine is further to filter the plurality of transaction log entries to eliminate false positives.

There is further disclosed an example, wherein filtering the plurality of transaction log entries comprises filtering if the same field value reappears with the same {component, field} pair after a time threshold.

There is further disclosed an example, wherein filtering the plurality of transaction log entries comprises filtering if a value appearing with a {component, field} pair is shared among multiple components within a time threshold.

There is further disclosed an example, wherein the log analysis engine is further to pre-process the plurality of transaction log entries to eliminate a field unlikely to be a meaningful transaction identifier.

There is further disclosed an example, wherein the field unlikely to be a meaningful transaction identifier is selected from the group consisting of a uniform resource locator (URL), media access control (MAC) address, a floating point value, a common English word, and an integer value below a threshold.

There is further disclosed an example, wherein the threshold is contextual.

There is further disclosed an example of one or more tangible, non-transitory computer-readable mediums having stored thereon executable instructions for instructing a processor to provide a log analysis engine to: receive a log stream comprising a plurality of transaction log entries, the log entries comprising a time stamp, a component identification (ID), and a name value pair identifying a transaction; create an index comprising mapping a key ID to a name value pair of a log entry; and select from the index a key ID having a relatively large number of repetitions.

There is further disclosed an example, wherein the log analysis engine is further to filter the plurality of transaction log entries to eliminate false positives.

There is further disclosed an example, wherein filtering the plurality of transaction log entries comprises filtering if the same field value reappears with the same {component, field} pair after a time threshold.

There is further disclosed an example, wherein filtering the plurality of transaction log entries comprises filtering if a value appearing with a {component, field} pair is shared among multiple components within a time threshold.

There is further disclosed an example, wherein the log analysis engine is further to pre-process the plurality of transaction log entries to eliminate a field unlikely to be a meaningful transaction identifier.

There is further disclosed an example, wherein the field unlikely to be a meaningful transaction identifier is selected from the group consisting of a uniform resource locator (URL), media access control (MAC) address, a floating point value, a common English word, and an integer value below a threshold.

There is further disclosed an example of one or more tangible, non-transitory computer-readable storage mediums having stored thereon executable instructions for instructing one or more processors for providing a log analysis engine operable for performing any or all of the operations of the preceding examples.

There is further disclosed an example of a method of providing a log analysis engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computer-implemented method of providing automated log analysis, the method comprising the steps of:
   receiving a log stream with a plurality of transaction log entries;
   pre-processing, by parsing and structuring, the plurality of transaction log entries to a name-value format, each of the plurality of transaction log entries including a time stamp, a component identification, and a name-value pair identifying a transaction, the name-value pair including a name field paired with a value field;
   before creating an index, filtering the plurality of transaction log entries to eliminate any false positives;
   when the plurality of transaction log entries include the name-value format per the pre-processing:
      creating the index of the plurality of transaction log entries, with a key identification (ID) mapped to the component identification of each of the plurality of transaction log entries,
      selecting, from the index, the key ID based on a number of repetitions of the key ID; and
      based on the selection of the key ID, building without a priori knowledge, a transaction model; and
   when the plurality of transaction log entries do not include the name-value format per the pre-processing, diverting or rejecting the plurality of transaction log entries.

2. The method of claim 1, wherein the filtering is performed if a same field value reappears with a same {component, field} pair after a time threshold.

3. The method of claim 1, wherein the filtering is performed if a value appearing with a {component, field} pair is shared among multiple components within a time threshold.

4. The method of claim 1,
   wherein,
      the pre-processing includes eliminating a field unlikely to be a meaningful transaction identifier, and
      the format is a set of {field name: field value} pairs.

5. The method of claim 4, wherein the field unlikely to be the transaction identifier is selected from the group consisting of a uniform resource locator (URL), media access control (MAC) address, a floating point value, a common English word, and an integer value below a threshold.

6. The method of claim 5, wherein the threshold is contextual.

7. The method of claim 1, further comprising:
defining, via the transaction model, transaction tracking rules configured to track the plurality of transaction log entries based on key ID.

8. A computing apparatus comprising:
a log analysis engine comprising at least a processor and a memory, the log analysis engine configured to:
receive a log stream with a plurality of transaction log entries;
pre-process, by parsing and structuring, the plurality of transaction log entries to a name-value format, each of the plurality of transaction log entries including a time stamp, a component identification, and a name-value pair identifying a transaction, the name-value pair including a name field paired with a value field;
before creation of an index, filter the plurality of transaction log entries to eliminate any false positives;
when the plurality of transaction log entries include the name-value format per the pre-process:
create the index of the plurality of transaction log entries, with a key identification (ID) mapped to the component identification of each of the plurality of transaction log entries,
select, from the index, the key ID based on a number of repetitions; and
based on the selection of the key ID, build without a priori knowledge, a transaction model; and
when the plurality of transaction log entries do not include the name-value format per the pre-process, divert or reject the plurality of transaction log entries.

9. The apparatus of claim 8, wherein filtering of the plurality of transaction log entries is performed by the log analysis engine if a same field value reappears with a same {component, field} pair after a time threshold.

10. The apparatus of claim 8, wherein filtering of the plurality of transaction log entries is performed by the log analysis engine if a value appearing with a {component, field} pair is shared among multiple components within a time threshold.

11. The apparatus of claim 8,
wherein,
pre-processing of the plurality of transaction log entries includes eliminating a field unlikely to be a transaction identifier, and
the format is a set of {field name: field value} pairs.

12. The apparatus of claim 11, wherein the field unlikely to be the transaction identifier is selected from the group consisting of a uniform resource locator (URL), media access control (MAC) address, a floating point value, a common English word, and an integer value below a threshold.

13. The apparatus of claim 12, wherein the threshold is contextual.

14. The apparatus of claim 8, wherein the log analysis engine is further configured to: define, via the transaction model, transaction tracking rules configured to track the plurality of transaction log entries based on key ID.

15. One or more tangible, non-transitory computer-readable mediums having stored thereon executable instructions for instructing a processor to provide a log analysis engine configured to:
receive a log stream with a plurality of transaction log entries;
pre-process, by parsing and structuring, the plurality of transaction log entries to a name-value format, each of the plurality of transaction log entries including a time stamp, a component identification, and a name-value pair identifying a transaction, the name-value pair including a name field paired with a value field;
before creation of an index, filter the plurality of transaction log entries to eliminate any false positives;
when the plurality of transaction log entries include the name-value format per the pre-process:
create the index of the plurality of transaction log entries, with a key identification (ID) mapped to the component identification of each of the plurality of transaction log entries,
select, from the index, the key ID based on a number of repetitions; and
based on the selection of the key ID, build without a priori knowledge, a transaction model; and
when the plurality of transaction log entries do not include the name-value format per the pre-process, divert or reject the plurality of transaction log entries.

16. The one or more tangible, non-transitory computer-readable mediums of claim 15, wherein filtering of foe plurality of transaction log entries is performed by the log analysis engine if a same field value reappears with a same {component field} pair alter a time threshold.

17. The one or more tangible, non-transitory computer-readable mediums of claim 15, wherein filtering of foe plurality of transaction log entries is performed by the log analysis engine if a value appearing with a {component, field} pair is shared among multiple components within a time threshold.

18. The one or more tangible, non-transitory computer-readable mediums of claim 15,
wherein,
pre-processing of the plurality of transaction log entries includes eliminating a field unlikely to be a transaction identifier, and
the format is a set of {field name: field value} pairs.

19. The one or more tangible, non-transitory computer-readable mediums of claim 18, wherein the field unlikely to be the transaction identifier is selected from the group consisting of a uniform resource locator (URL), media access control (MAC) address, a floating point value, a common English word, and an integer value below a threshold.

20. The one or more tangible, non-transitory computer-readable mediums of claim 15, further comprising instructions for instructing a processor to: define, via the transaction model, transaction tracking rules configured to track the plurality of transaction log entries based on key ID.

* * * * *